United States Patent Office 2,741,657
Patented Apr. 10, 1956

2,741,657

ACID AMIDE DERIVATIVES OF AZO DYESTUFFS

Max Schmid, Riehen, Eduard Moser, Basel, Jakob Danuser, Arlesheim, Rudolf Mory, Binningen, Willy Mueller, Riehen, and Jakob Wuergler, Neuewelt, near Basel, Switzerland, assignors to Ciba Limited, Basel, Switzerland, a Swiss firm No Drawing. Application October 19, 1953,
Serial No. 387,066

Claims priority, application Switzerland October 20, 1952

11 Claims. (Cl. 260—160)

The present application is a continuation-in-part of our copending application Serial No. 273,364, filed February 25, 1952.

This invention relates to new acid amide derivatives of azo dyestuffs which are free from sulfonic acid groups and correspond to the general formula (1) $R_3-N=N-R_1-CO-N-R_5-N-OC-R$
$\qquad\qquad\qquad\qquad\quad\;\; | \qquad\; |$
$\qquad\qquad\qquad\qquad\quad\;\; x \qquad\; x$ wherein $R_1$—CO— stands for the radical of a diazo component, $R_3$ for the radical of an azo component containing a hydroxyl group in a position vicinal to the azo group, —OC—R for a radical containing at least one azo group, $x$ for hydrogen or a lower alkyl group, and (2) $\qquad -N-R_5-N-$
$\qquad\quad\;\; | \qquad\; |$
$\qquad\quad\;\; x \qquad\; x$ represents the radical of a non-vattable diamine.

These acid amide derivatives are advantageously made by condensing 2 mols of a halide of the formula (3) $\qquad R_3-N=N-R_1-CO-$Halogen or one mol each of two different halides of the formulae (3) $R_3-N=N-R_1-CO-$Halogen and
$\qquad\qquad$ Halogen—OC—$R_2-N=N-R_4$ (4)

or one mol each of two different halides of the formulae (3) $R_3-N=N-R_1-CO-$Halogen and
$\qquad\qquad\qquad\qquad$ Halogen—OC—R (5)

with 1 mol of a diamine of the formula (6) $\qquad H-N-R_5-N-H$
$\qquad\qquad\; | \qquad\; |$
$\qquad\qquad\; x \qquad\; x$ The significance of the symbols $R_1$, $R_3$, $R_5$, R and $x$ can be derived from the first paragraph. In Formula 4 —OC—$R_2$ stands for a radical of a diazo component different from $R_1$—CO—, and $R_4$ for a radical of an azo component which is different from $R_3$ and which in a position vicinal to the azo group contains a hydroxyl group. It can furthermore be seen from the above that the diamines of the Formula 6 have to be condensed at least on one side with a carboxylic acid halide of the Formula 3 and that the second carboxylic acid halide may be of any desired constitution, provided that it contains at least one azo group and does not contain any sulfonic acid group.

The acid halides of the Formulae 3, 4 and 5 can be obtained by treating the corresponding carboxylic acids with acid halogenating agents. The carboxylic acids of the formulae (7) $\qquad R_3-N=N-R_1-COOH$ and (8) $\qquad R_4-N=N-R_3-COOH$ on the other hand, can be prepared by per se conventional methods by coupling a diazo compound which is free from sulfonic acid groups and contains a carboxyl group with an azo component which is also free from sulfonic acid groups and capable of coupling with an azo component bound in a position vicinal to a hydroxyl group, e. g. a hydroxyl group bound to an aryl carbon atom or an enolized keto group.

The diazo compounds can be obtained, for example, from aminocarboxylic acids of the naphthalene series, such as 2-aminonaphthalene-3-carboxylic acid or preferably from those of the benzene series which compounds, in addition to the amino group and the carboxylic acid group, may contain further substituents as, for example, halogen atoms, especially chlorine, alkyl groups, such as methyl and ethyl, alkoxy groups, such as methoxy and ethoxy, phenoxy groups, acylamino groups, nitro groups, trifluormethyl groups or alkyl sulfone groups. The aminocarboxylic acids may also contain two uncondensed aryl radicals which are attached to each other directly or through a bridge member, e. g. an —$SO_2$—, —O—, —CO—, —CO—NH— or —N=N— bridge. The amino group and the carboxylic acid group may be attached to the same nucleus or to different nuclei.

Examples of these aminocarboxylic acids are:

1-aminobenzene-2-, -3- or -4-carboxylic acid,
1-amino-2-chlorobenzene-3-carboxylic acid,
1-amino-4-chlorobenzene-3-carboxylic acid,
1-amino-2-nitrobenzene-4-carboxylic acid,
1-amino-4-nitrobenzene-3-carboxylic acid,
1-amino-2-methoxybenzene-5-carboxylic acid,
4-(4'-aminobenzoylamino)-benzene-1-carboxylic acid,
2-amino-4-methyl-1,1'-diphenylsulfone-4'-carboxylic acid,
1-amino-2-phenoxybenzene-5-carboxylic acid
3- or 4-aminophenyl acetic acid
4 - amino - 2 - methoxy - 6 - methyl - 2' - chloro - 1,1' - azobenzene-4'-carboxylic acid.

The azo components which are used for the preparation of the carboxylic acid of the Formulae 7 and 8 and which are capable of coupling in a position vicinal to a hydroxyl group bound to an aryl carbon atom may, as for instance 2- or 3-oxy carbazole, N-methyl-3-hydroxycarbazole and 3-hydroxydiphenylene oxide, contain hetero rings. Hydroxybenzenes capable of coupling, such as 4-methyl-, 4-tertiary amyl- or 4-methyl-2-acylamino-1-hydroxy-benzene may also be used. Especially advantageous are hydroxynaphthalenes coupling in a position vicinal to the hydroxyl group, such as 4-methyl-1-hydroxy-naphthalene, 5,8 - dichloro - 1 - hydroxynaphthalene, 8 - acylamino-2-hydroxynaphthalenes and particularly 2-hydroxy-naphthalene as also the arylamides of 2-hydroxynaphthalene-3-carboxylic acid, such as 2-hydroxynaphthalene-3-carboxylic acid-naphthyl-(1)-amide, -phenylamide, -2'- or -4'-methoxyphenylamide, and also the arylamides of 2-hydroxy-diphenylene oxide-3-carboxylic acid, for example, the 2',5'-dimethoxyphenylamide or those of 2-hydroxy-carbazole-3-carboxylic acid, for example the 4'-chlorophenylamide and also the acylamide of 2-hydroxyanthracene-3-carboxylic acid, for example the 2'-methylphenylamide.

As azo components, in the case of which coupling takes place in a position vicinal to the enolized keto group, there may be used for example compounds in which the keto group is situated in an open chain, such as the di-(parachlorobenzoyl)-methane of the formula

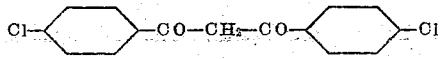

or acylacetyl amino compounds. However, the keto group may alternatively be situated in a ring, as for example in the case of the pyrazolones or 2,4-dihydroxy-quinolines. Among the acylacetylamino compounds, there may be mentioned the acylacetylaminoaryl compounds, for example, the benzoylacetylaminoaryl compounds, especially the acetoacetylaminoaryl compounds of the benzene series. The aryl radicals bound to the acylacetylamino group may, in addition to this group, contain further non-solubilizing substituents as, for example, lower alkyl or alkoxy groups or halogen atoms, such as chlorine, also acetylamino groups or sulfonic acid amide groups. There can also be used azo components whose acylacetylamino group is bound to a carbon atom in a hetero ring. Examples of suitable azo components are 1-benzoylacetylaminobenzene, 1-benzoylacetylamino-2-methoxy-5-methylbenzene and the acetoacetylamino compound derived from the following amines of the benzene series: Aminobenzene, 1-amino-2-chlorobenzene, 1-amino-2-methylbenzene, 1-amino-4-methylbenzene, 1-amino-2-methoxybenzene, 1-amino-2,5-dichlorobenzene, 1-amino-2,4-dimethyl-5-chlorobenzene, 1-amino-2-chloro-4-acetylamino-5-methoxybenzene, 1-amino-2-chloro-5-trifluoromethylbenzene, 1-amino-2,5-dimethoxy-4-chlorobenzene, 1-aminobenzene-3-sulfonic acid amide, 1-amino-2-methoxy-5-methylbenzene, 1-amino-2-methoxy-5-methyl-4-chlorobenzene, 1-amino-2,6-dimethylbenzene.

As azo component with an acylacetylamino group bound to a carbon atom of a hetero ring there may be mentioned for example the 2-acetoacetylamino-6-methoxy-benzthiazole.

Among the pyrazolones, which can also be used as azo components, for example, the 1-aryl-3-methyl-5-pyrazolones, especially the 1-phenyl-3-methyl-5-pyrazolones, yield valuable dyestuffs. The aryl radicals may in this case also carry additional substituents. As examples there may be mentioned in this connection 1-naphthyl-(2)-3-methyl-5-pyrazolone, 1-phenyl-3-methyl-5-pyrazolone, 1-(2'-chlorophenyl)-3-methyl-5-pyrazolone and 1-(2'-methoxy-5'-methyl)-3-methyl-5-pyrazolone.

As acid halides of the constitution (5)     Halogen—OC—R which do not at the same time correspond to the Formula 3 or 4 there can be used azo dyestuffs which are free from sulfonic acid groups, contain a halogen—OC group in the radical of the azo component, and for the rest may have any desired configuration. The carboxylic acids containing azo groups capable of conversion into these acid halides can be prepared, for examples, by coupling diazo compounds of the naphthalene or benzene series, especially such as are suitable for the production of ice colors, with azo components containing carboxylic acid groups and coupling in a position vicinal to a hydroxyl group. Examples of diazo components suitable for the production of such carboxylic acids containing azo groups and corresponding to the formula (9)     HOOC—R are the following monoamines having but a single benzene nucleus: Monochloranilines, such as 2-, 3- and 4-chloraniline, aminobenzenes with several different substituents, such as 2-methyl- or 2-methoxy-5-nitroaniline, 2-methyl-3-, -4-, -5- or -6-chloraniline, 2-nitro-4-chloro- or -4-methyl- or 4-methoxyaniline, 2-methoxy-5-methylaniline, 2:5-dimethoxy-4-chloraniline and 4-chloro-2,5-di-methylaniline.

In analogous manner there can also be used monoamines of the benzene series having more than one benzene nucleus, such as 2-amino-4:4'-dichlorodiphenyl ether, 2-aminodiphenyl sulfone, 1-amino-2:5-dialkoxy- (especially methoxy- or ethoxy-) -4-benzoyl-amino-benzene, 1-amino-2-alkoxy- (e. g. -methoxy) -4-benzoylamino-5-methyl benzene, 1-amino-3-methyl-6-methoxy-4-benzoyl-aminobenzene, 1-amino-2:4-dimethyl-5-benzoylaminobenzene, 1-amino-2-methyl-5-chloro-4-benzoylaminobenzene, 1-amino-2-chloro-5-methoxy-4-benzoylaminobenzene; there can also be used aminochrysene, aminopyrene, 4-amino-2'-3-dimethyl-1:1'-azobenzene, 4-amino-2:5-dimethoxy-4'-nitro-2',6'-dichloro1:1'-azobenzene, aminodiphenylamines or their N-substitution products. Furthermore, there can be used amines with trifluormethyl groups, such as 4-chloro-2-trifluormethylaniline, 3:5-di-(trifluormethyl)-1-aniline, 2-chloro-5-trifluormethylaniline. Finally, the amines mentioned may also contain alkylsulfone-, aralkylsulfone- or sulfonic acid amide groups, such as the 2-methoxy-5-ethylsulfone aniline, the 2-methoxy-5-benzyl-sulfone aniline, the 2-methoxy-1-aminobenzene-5-sulfonic acid-diethyl-amide, the 2-ethyl-sulfone-5-trifluormethylaniline.

To produce the carboxylic acids of the Formula 9 such as other amines can be combined with any desired carboxylic acids capable of coupling in a position vicinal to a hydroxyl group, e. g. with 2-hydroxynaphthalene-3-carboxylic acid, 2-hydroxycarbazole-3-carboxylic acid or their N-alkyl derivatives, 2-hydroxyanthracene-3-carboxylic acid, or with 3-hydroxydiphenylene-oxide-2-carboxylic acid, 3-hydroxydiphenylene-sulfide-2-carboxylic acid. As coupling components there may also be used open-chain or heterocyclic compounds having an enolizable keto group, of which it is generally assumed that after coupling they are predominantly in the enol form, that is to say, that they contain a hydroxyl group in a position vicinal to the azo group. Examples are pyrzalone-carboxylic acids, e. g. 1-aryl-5-pyrazolone-3-carboxylic acids or such arylpyrazolones as contain a carboxyl group bound to the aryl radical; there may be mentioned as examples 1-phenyl-5-pyrazolone-3-carboxylic acid and 1-phenyl-3-methyl-5-pyrazolone-4'-carboxylic acid, as also arylides of β-keto-carboxylic acids which contain carboxyl groups and in which the carboxyl group is not directly connected with the coupling carbon atoms, as for instance, 1-acetoacetylaminobenzene-2-, -3- or -4-carboxylic acid and 1-benzoylacetylaminobenzene-3- or -4-carboxylic acid.

The azo compounds of the Formulae 7, 8 and 9, which contain carboxylic acid groups, are treated with acid halogenating agents. As such agents there are to be understood those which are capable of converting carboxylic acids into their acid halides, e. g. the bromides or chlorides, especially phosphorus halides, phosphorus penta bromide or phosphorus trichloride or -pentachloride and -hydroxyhalides. It is of advantage to use acid chlorinating agents, that is to say, such as are used for the preparation of the corresponding acid chlorides, such as phosphorus pentachloride and thionyl chloride.

The treatment with such acid halogenating agents is advantageously carried out in an inert organic solvent, such as dimethyl formamide, chlorobenzene, e. g. mono- or di-chlorobenzene, toluene, xylene, benzene or nitrobenzene.

In the preparation of such acid halides it is as a rule of advantage first to dry the azo compounds produced in an aqueous medium, or to free them from water by boiling in an organic solvent. If desired, this azeotropic drying operation can be carried out immediately preceding the treatment with acid halogenating agents.

As diamines of the Formula 6 there are advantageously used those in which R₅ stands for an aromatic radical, e. g. a radical of the naphthalene or benzene series, the amino groups being primary amino groups, or if desired, secondary amino groups. The diamines may be mononuclear, as for example, 1:4-diaminobenzene, 1:4-diamino-2:5-dialkoxybenzenes, or 1:4-diaminobenzenes, of which the 2- and 5-positions are occupied by substituents of various kinds, such as nitro groups, halogen atoms, alkoxy groups, alkyl group.

As a rule, especially valuable results are obtained when di- or polynuclear amines are used, as for example, 4:4'-diamino-diphenyl or derivatives thereof, as for example, 3:3'-dichloro-, 3:3'-dimethyl-, 3:3'-dialkoxy-4:4'-diamino-diphenyl, 3:5:3',5'-tetrachloro-4:4'-diaminodiphenyl or 3:5:3':5'-tetramethyl-4:4'-diamino-diphenyl. In many cases valuable dyestuffs are obtained by using diamines of the benzene series in which two like or different benzene nuclei are linked together by a suitable bridge member, for example by oxygen, —SO₂—, such as 4:4'-diaminodiphenylsulfone, 3:3' - diamino - 4:4' - dichlorodiphenylsulfone, 3:3' - diamino - 4:4' - dimethoxydiphenylsulfone, —CO— such as 3:3'-diaminodiphenylketone, 3:3'-diamino-4:4'-dichlorodiphenylketone, 3:3'-diamino-4:4'-dimethoxydiphenylketone, —CH₂—, such as 3:3'-diaminodiphenylmethane, 3:3' - diamino - 4:4' - dichlorodiphenylmethane, 4:4' - diamino - 3:3' - dichlorodiphenylmethane, 4:4' - diamino - 3:5:3':5' - tetrachlorodiphenylmethane

—NHCO—, NHCONH—, —SO₂NH—,
—CH=CH—, —CH₂—CH₂—,
—HN—OC—C₂H₄—CO—NH—, —N=N—

Finally, diamines of an entirely different kind may be used, for example, 2:8-diaminochrysene, 4:11-diaminofluoranthene, 2:6- or 1:5-diaminonaphthalene, 2:6-diaminobenzthiazoles, such as 2-(4'-aminophenyl)-6-aminobenzthiazole.

The condensation of the carboxylic acid halides described above with the diamines is advantageously conducted in a substantially anhydrous medium. Under these conditions the condensation generally proceeds surprisingly easily even at temperatures within the range of the boiling points of normal organic solvents such as toluene, monochlorobenzene, dichlorobenzene, trichlorobenzene, nitrobenzene and the like. In order to accelerate the reaction it is generally desirable to remove the hydrochloric acid formed in the condensation, for example by continuous distillation, boiling under reflux or adding an acid binding agent, such as anhydrous sodium acetate, pyridine or anhydrous ammonia. The dyestuffs so obtained are in part crystalline and in part amorphous, and are generally obtained in a very good yield and in a pure state. It may be of advantage, in order to produce especially pure dyestuffs, first to isolate the acid chlorides obtained from the carboxylic acids, and if desired, to recrystallize them. In some cases, however, the isolation of the acid chloride may be dispensed with without any harmful effects, and in some cases even with an improvement in the result, and the condensation carried out immediately following the preparation of the acid chloride. When it is desired to produce asymmetrical acid amide derivatives, the condensation of the diamine with the two different acid halides can be carried out in two stages or in a single stage.

The new acid amide derivatives of azo dyestuffs corresponding to the Formula 1 are pigments and are for the greater part particularly fast to migration and are also distinguished by their resistance to temperature and to solvents. These properties are valuable above all for so-called pigment printing, that is to say, printing processes which depend on fixing pigments by means of suitable adhesives, such as casein, hardenable plastics, especially urea-formaldehyde or melamine-formaldehyde condensation products, polyvinyl chloride or polyvinyl acetate solutions or emulsions or other emulsions (for example, oil-in-water or water-in-oil emulsions) on a substratum, especially on textile fibers but also on other flat shaped structures such as paper (for example wall papers) or fabrics made of glass fibers. The pigments obtainable by the present process can also be used for other purposes, for example, in a finely dispersed form for dyeing artificial silk made of viscose or cellulose ethers or esters or superpolyamides or superpolyurethanes in the spinning solution, and also serve well in the manufacture of colored lakes or lake formers, solutions and products made of acetyl cellulose, nitrocellulose, natural resins or artificial resins such as polymerization or condensation resins, for example, aminoplasts, phenoplasts, polystyrene, polyethylene, polyacryl, rubber, casein, silicones and silicone resins. They can also be used with advantage in the manufacture of colored pencils, cosmetic preparations and laminated plates.

By virtue of the especially favorable physical form in which the products of the invention are generally obtained, and owing to their chemical inertness and good temperature resistance, they can usually be dispersed easily in masses or preparations of the aforesaid kind, and advantageously at a stage at which these masses or preparations have not yet reached their final shape. The operations necessary for shaping, such as spinning, pressing, hardening, casting, sticking, can then be carried out without difficulty in the presence of the pigments of this invention, without any chemical reactions of the substratum such as further polymerizations, condensations, etc. being inhibited.

The following examples illustrate the invention, the parts and percentages being by weight unless otherwise stated, and the relationship of parts by weight to parts by volume being the same as that of the kilogram to the liter.

*Example 1*

48.6 parts of the dyestuff obtained in the usual manner from diazotized 4-amino-3-nitrobenzene-1-carboxylic acid and 2-hydroxynaphthalene-3-carboxylic acid ortho-anisidide are introduced into 300 parts of nitrobenzene while stirring. 17 parts of thionyl chloride are added to the mixture and the whole heated to 130–150° C. After about an hour the acid chloride of the dyestuff passes into solution. The reaction mass is heated to 130–150° C. for about one hour longer and then allowed to cool. The precipitated crystalline product is suction-filtered and washed with a small amount of cold benzene, then dried under reduced pressure at 70 to 80° C. (melting point of the acid chloride 272–273° C.).

25.2 parts of the acid chloride prepared as described in the preceding paragraph are introduced into 770 parts of dry chlorobenzene and 5 parts of pyridine. 2.7 parts of 1:4-diaminobenzene are added and the mixture heated to the boil while stirring for about 24 hours. When the condensation is complete the resulting pigment is suction-filtered while hot, washed with warm chlorobenzene, then with hot alcohol, and dried. The condensation dyestuff of the formula

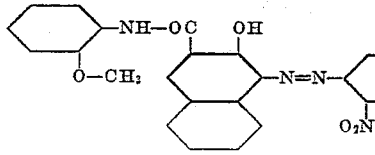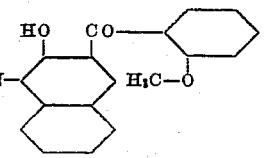

is a red pigment which is difficultly soluble to insoluble in the usual solvents. When incorporated by rolling e. g. in polyvinyl chloride, there is obtained a strong red-orange coloration of good fastness to migration and light.

Example 2

53.3 parts of the dyestuff obtained in the usual manner from diazotized 1-amino-2-phenoxybenzene-5-carboxylic acid and 2-hydroxynaphthalene-3-carboxylic acid-para-anisidide are introduced into 1000 parts of nitrobenzene while stirring. 17 parts of thionyl chloride are added and the mixture heated to 130–150° C. After about an hour the acid chloride of the dyestuff passes into solution. The reaction mass is heated to 130 to 150° C. for about an hour longer and then allowed to cool. The precipitated crystalline product is suction-filtered and washed with a small amount of cold benzene, then dried at 70–80° C. under reduced pressure. (Melting point of the acid chloride, 270–271° C. with decomposition.)

27.5 parts of the acid chloride prepared as described in the preceding paragraph are introduced into 770 parts of dry chlorobenzene and 5 parts of pyridine. 2.7 parts of 1:4-diaminobenzene are added to the mixture which is then heated to the boil while stirring for about 24 hours. When the condensation is complete, the resulting pigment is suction-filtered while hot, washed with warm chlorobenzene, then with hot alcohol, and dried. The condensation dyestuff obtained is a red pigment which is difficultly soluble to insoluble in the usual solvents. When incorporated by rolling e. g. into polyvinyl chloride, strong bluish red shades of good fastness to migration and light are obtained.

In the table given below are set out further valuable dyestuffs which are obtained by condensing in the manner described above two molecular proportions of the dyestuff, converted into its acid chloride, from the diazo component given in column I and the azo component given in column II with one molecular proportion of the diamine given in column III.

dioxide subsides. The whole is allowed to cool until the internal temperature is 80–90° C., and a filtered, dry solution of 10.6 parts of 3:3'-dimethyl-4:4'-diaminodiphenyl in 200 parts of chlorobenzene is added. The whole is heated at the boil for 4 hours that is to say until the splitting off of hydrogen chloride has subsided. The precipitated dyestuff pigment is separated by filtering with suction, while hot, and the filter residue is washed with warm chlorobenzene solution and then with hot ethyl alcohol. The washed dyestuff of the formula

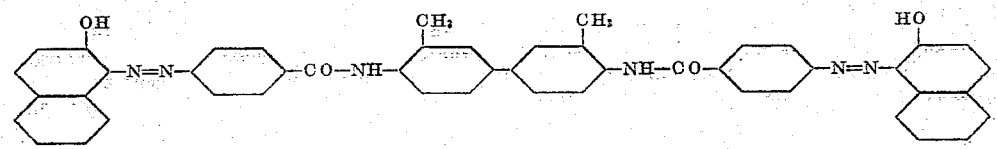

is dried at 80–90° C. The dyestuff is a fine orange powder which dissolves in concentrated sulfuric acid with a bluish violet coloration and colors plastic materials, above all polyvinyl chloride, orange tints which are fast to migration. In pigment printing processes there are obtained prints which are fast to solvents.

Example 4

29.2 parts of the dry dyestuff from diazotized 1-aminobenzene-4-carboxylic acid and 2-hydroxynaphthalene are stirred in 250.0 parts of benzene at ordinary temperature. At this temperature 23.0 parts of phosphorus pentachloride are introduced in the course of 30 minutes. The temperature rises from about 20° C. to 30° C. The whole is stirred for a few hours longer and heated at 40–50° C. The whole is allowed to cool, the resulting acid chloride of the dyestuff is separated by filtering with suction and washed with a small amount of benzene. The acid chloride is dried in vacuo at 60° C.

The acid chloride obtained in this manner is condensed in the manner described in Example 1 with 10.6 parts of 3:3'-dimethyl-4:4'-diamino-diphenyl and worked up. The dyestuff corresponds to that of Example 3.

By esterification in pyridine with benzene-3-sulfonic acid chloride-1-carboxylic acid the pigment can be converted into a product suitable for printing.

|   | I. Diazo component | II. Azo component | III. Diamine | IV. color |
|---|---|---|---|---|
| 1 | 1-amino-2-chlorobenzene 5-carboxylic acid | 2-hydroxynaphthalene 3-carboxylic acid-2'-methylphenylamide. | 1:4-diaminobenzene | orange. |
| 2 | ....do.... | ....do.... | 3:3'-dimethyl-4:4'-diaminodiphenyl | Do. |
| 3 | ....do.... | 6-bromo-2-hydroxynaphthalene-3-carboxylic acid-2'-methoxyphenylamide. | 1:4-diaminobenzene | red. |
| 4 | ....do.... | ....do.... | 1:5-diaminonaphthalene | bluish red. |
| 5 | 2-amino-4'-chloro-1:1'-diphenylether-4-carboxylic acid. | 2-hydroxynaphthalene-3-carboxylic acid-4'-chlorophenylamide. | 4:4'-diaminodiphenyl | red. |
| 6 | ....do.... | 2-hydroxynaphthalene-3-carboxylic acid-2':5'-dichlorophenylamide. | 1:4-diaminobenzene | Do. |
| 7 | ....do.... | 2-hydroxynaphthalene-3-carboxylic acid-2'-methoxyphenylamide. | ....do.... | scarlet. |

Example 3

29.2 parts of the dyestuff from diazotized 1-aminobenzene-4-carboxylic acid and 2-hydroxynaphthalene are boiled in 500.0 parts of chlorobenzene, with the use of a descending condenser, until water no longer passes over. The whole is allowed to cool to about 55° C. and 23.8 parts of thionyl chloride are added in the course of 15 minutes. The whole is heated for about one hour at 80–90° C., and then at the boil for 3 hours, that is to say, until the evolution of hydrochloric acid and sulfur By using, instead of 3:3' - dimethyl - 4:4' - diaminodiphenyl, 4:4'-diaminodiphenyl, there is obtained an orange pigment, and with 3:3'-dimethoxy-4:4'-diaminodiphenyl a brownish red.

In the table given below are set out further acid amide derivatives of azo dyestuffs which are obtained by condensing in the manner described above two mols of the azo dyestuff from the diazo component shown in column I and the azo component shown in column II with the diamine given in column III. The condensation is advantageously conducted in the solvent given in column IV.

| | I. Diazo component | II. Azo component | III. Diamine | IV. Solvent | Color of material colored with this dyestuff |
|---|---|---|---|---|---|
| 1 | 1-amino-4-chlorobenzene-3-carboxylic acid. | 2-hydroxynaphthalene | 4:4'-diamino-3:3'-dimethyldiphenyl. | chlorobenzene | orange. |
| 2 | ---do--- | ---do--- | 4:4'-diamino-3:3'-dichlorodiphenyl. | ---do--- | Do. |
| 3 | 4-[4'-aminobenzoyl]-aminobenzene-1-carboxylic acid. | ---do--- | ---do--- | ---do--- | yellow-orange. |
| 4 | 1-amino-2-nitrobenzene-4-carboxylic acid. | ---do--- | 4:4'-diaminodiphenyl | ---do--- | reddish brown. |
| 5 | ---do--- | ---do--- | 4:4'-diaminodiphenylether | ---do--- | Do. |
| 6 | ---do--- | ---do--- | 3:3'-diaminodiphenylmethane | ---do--- | Do. |
| 7 | ---do--- | ---do--- | 1:5-diaminonaphthalene | ---do--- | yellow-brown. |
| 8 | ---do--- | ---do--- | 2:8-diaminochrysene | ---do--- | yellowish orange. |
| 9 | ---do--- | ---do--- | 3:8-diaminopyrene | ---do--- | Do. |
| 10 | ---do--- | ---do--- | 4:4'-diamino-1:1'-azobenzene | ---do--- | Do. |
| 11 | 1-amino-4-nitrobenzene-3-carboxylic acid. | ---do--- | 1:4-diaminobenzene | ---do--- | brown. |
| 12 | 2-amino-4-methyl-1:1'-diphenyl-sulfone-4'-carboxylic acid. | ---do--- | ---do--- | ---do--- | orange. |
| 13 | ---do--- | ---do--- | 4:4'-diamino-3:3'-dimethyldiphenyl. | ---do--- | yellowish orange. |
| 14 | ---do--- | ---do--- | 4:4'-diamino-3:3'-dichlorodiphenyl. | ---do--- | reddish yellow. |
| 15 | 1-amino-2-chlorobenzene-5-carboxylic acid. | ---do--- | 4:4'-diamino-3:3'-dimethyldiphenyl. | ---do--- | reddish orange. |
| 16 | ---do--- | ---do--- | 4:4'-diamino-3:3'-dimethoxydiphenyl. | ---do--- | yellowish brown. |
| 17 | ---do--- | ---do--- | 1:4-diaminobenzene | ---do--- | brown. |
| 18 | 4-amino-3-methoxy-6-methyl-2'-chloro-1:1'-azobenzene-3'-carboxylic acid. | ---do--- | 4:4'-diamino-3:3'-dimethyldiphenyl. | ---do--- | bordeaux. |
| 19 | 1-amino-2-chlorobenzene-5-carboxylic acid. | 9-methyl-2-hydroxycarbazole. | 4:4'-diamino-3:3'-dichlordiphenyl. | o-dichlorobenzene | yellowish brown. |
| 20 | ---do--- | 5:8-dichloro-1-hydroxy-naphthalene. | 1:4-diamino-2:5-dichlorobenzene. | chlorobenzene | brown. |
| 21 | 1-amino-2-methoxybenzene-5-carboxylic acid. | 3-hydroxydiphenyleneoxide. | 1:4-diaminobenzene | ---do--- | orange. |
| 22 | 1-amino-2-nitrobenzene-4-carboxylic acid. | 2-hydroxycarbazole | ---do--- | ---do--- | brown. |
| 23 | ---do--- | 2:4-dihydroxyquinoline | ---do--- | ---do--- | yellow-brown. |
| 24 | 1-amino-2-chlorobenzene-5-carboxylic acid. | 2-hydroxy-8-benzoylamino-naphthalene. | 1:4-diamino-2:5-dichlorobenzene | ---do--- | scarlet. |
| 25 | ---do--- | ---do--- | 4:11-diaminofluoranthene | ---do--- | yellowish brown. |

Example 5

33.6 parts of the dyestuff prepared in the usual manner from diazotized 1-aminobenzene-4-carboxylic acid and 1-(4'-methylphenyl)-3-methyl-5-pyrazolone are stirred in 400 parts of chlorobenzene. 10 parts by volume of thionyl chloride are added and the whole gently boiled under reflux for 6 hours. The reaction mass is cooled externally to 10° C. and after some time the resulting dyestuff acid chloride is suction-filtered, washed with a small amount of cold chlorobenzene and dried under reduced pressure at 60–70° C. The resulting dyestuff acid chloride is an orange-colored powder which after recrystallization from chlorobenzene melts at 176–177° C.

35.5 parts of this dyestuff acid chloride are stirred with 800 parts of chlorobenzene and 10 parts of pyridine. 12.6 parts of 3:3'-dichloro-4:4'-diaminodiphenyl are added and the whole heated to the boil under reflux for 12 hours.

The reaction mass is allowed to cool to 90 to 100° C. and the precipitated dyestuff pigment is suction-filtered at this temperature and the filter residue washed with chlorobenzene having a temperature of about 100° C. until the washings are colorless. The pigment may then again be washed on a suction filter with hot alcohol, whereupon it is dried under reduced pressure at 70–80° C. The resulting dyestuff pigment of the formula

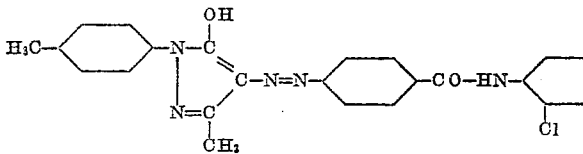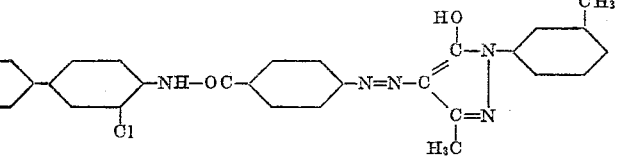

is an orange-colored powder which dissolves in concentrated sulfuric acid with an orange coloration and is very sparingly soluble or insoluble in the usual organic solvents. In the preparation of the dyestuff pigment, the separaiton of the dyestuff acid chloride is not essential.

The dyestuff pigment so obtained imparts to plastic material, e. g. polyvinyl chloride foils, a yellow color which is fast to light and migration. It can also be used for the preparation of lacquers which are fast to cross-spraying, for coloring any kind of plastic material and, preferably after conversion into extremely finely dispersed form, for coloring spinning solutions.

Similar pigments can be obtained by using as diazo components other aminocarboxylic acids, such, for example, as 1-amino-benzene-3-carboxylic acid, 4-chloro-3-aminobenzene-1-carboxylic acid, 3-amino-4-methoxy-benzene-1-carboxylic acid, amino-phenoxy-acetic acid, 3- or 4-aminophenyl-acetic acid, 3-chloro- or 3-bromo-4-aminophenyl-acetic acid.

Valuable yellow pigments are also obtained when in accordance with the above prescriptions the dyestuffs from diazotized 4-aminobenzene-1-carboxylic acid and 1-phenyl-3-methyl-5-pyrazolone or 1-(2'-chlorophenyl)-3-methyl-5-pyrazolone are converted into their acid chlorides and these condensed with 3:3'-dichloro-4:4'-diaminodiphenyl.

Example 6

35.6 parts of the dyestuff obtained in the usual manner from diazotized 4-aminobenzene-1-carboxylic acid and 1-(3'-chlorophenyl)-3-methyl-5-pyrazolone are introduced into 600 parts of chlorobenzene while stirring. 17 parts of thionyl chloride are added to the mixture which is then heated to the boil. After about 2 hours the acid chloride passes into solution. Boiling is continued for about one hour longer and the reaction mass then allowed to cool. The precipitated crystalline product is separated by filtering with suction, washed with a small amount of cold chlorobenzene, and dried at 70–80° C. under reduced pressure (melting point of the acid chloride, 170–171° C.).

18.7 parts of this acid chloride are introduced into 550 parts of dry chlorobenzene and 5 parts of pyridine. 6.3 parts of 3:3'-dichloro-4:4'-diaminodiphenyl are added to the mixture which is then heated to the boil while stirring. Boiling is continued for about 24 hours. When condensation is complete, the resulting pigment is separated by suction-filtering while it is still hot, washed with warm chlorobenzene, then with hot alcohol, and dried. The condensation dyestuff obtained is a yellow pigment which is sparingly soluble to insoluble in the usual solvents and produces a powerful reddish yellow coloration of good fastness to migration and light when incorporated by rolling e. g. into polyvinyl chloride.

*Example 7*

35.6 parts of the dyestuff obtained in the usual manner from diazotized 4-chloro-3-aminobenzene-1-carboxylic acid and 1-phenyl-3-methyl-5-pyrazolone are introduced into 470 parts of ortho-dichloro-benzene while stirring. 17 parts of thionyl chloride are added to the mixture which is then heated to about 130–150° C. After about one hour the acid chloride of the dyestuff passes into solution. Heating to 130–150° C. is continued for about an hour and the reaction mass then allowed to cool. The product precipitates in the form of crystals which are suction-filtered and washed with a small amount of cold chloro-benzene and then dried at 70–80° C. under reduced pressure.

18.7 parts of the acid chloride prepared as described in the preceding paragraph are introduced into 560 parts of dry ortho-dichlorobenzene and 10 parts of pyridine. 6.3 parts of 3:3'-dichloro-4:4-diaminodiphenyl are added to the mixture which is then heated to the boil while stirring for about 24 hours. When condensation is complete, the resulting pigment is suction-filtered while still hot, washed with warm ortho-dichlorobenzene, then with hot alcohol, and dried. The condensation dyestuff thus obtained is an orange-colored pigment which is sparingly soluble to insoluble in the usual solvents. When incorporated by rolling e. g. into polyvinyl chloride, it produces a yellow color of good fastness to migration and light.

When in the preparation of the starting material the 1-phenyl-3-methyl-5-pyrazolone is replaced by 1-(3'- or 4'-methylphenyl)-3-methyl-5-pyrazolone or by 1-(4'-chloro-2'-methylphenyl)-3-methyl-5-pyrazolone, yellow pigments with similar properties are obtained.

*Example 8*

40.1 parts of the dyestuff obtained in the usual manner from diazotized 4-amino-3-nitrobenzene-1-carboxylic acid and 1-(3'-chlorophenyl)-3-methyl-5-pyrazolone are introduced while stirring into 480 parts of nitrobenzene. 17 parts of thionyl chloride are added to the mixture which is then heated to 130–150° C. After about one hour the acid chloride of the dyestuff passes into solution. Heating to 130–150° C. is continued for about an hour and the reaction mass then allowed to cool. The precipitated crystalline product is suction-filtered, washed with a small amount of cold benzene, and dried at 70–80° C. under reduced pressure. (Melting point of the acid chloride, 220–223° C.)

21 parts of the acid chloride prepared as described above are introduced into 550 parts of dry chlorobenzene and 5 parts of pyridine. 2.7 parts of 1:4-diaminobenzene are added to the mixture which is then heated to the boil for about 24 hours while stirring. When condensation is complete the resulting pigment is suction-filtered while still hot, washed with warm chlorobenzene, then with hot alcohol, and dried. The condensation dyestuff obtained is an orange-colored pigment which is sparingly soluble or insoluble in the usual solvents and which, when incorporated by rolling, for instance in polyvinyl chloride produces a vivid, powerful orange color of good fastness to migration and light.

In the table given below are set out further valuable dyestuffs which are obtained by condensing in the manner described above two molecular proportions of the dyestuff, converted into its acid chloride, from the diazo component given in column I and the azo component given in column II with one molecular proportion of the diamine given in column III.

| | I. Diazo component | II. Azo component | III. Diamine | IV. Color |
|---|---|---|---|---|
| 1 | 1-amino-2-chlorobenzene-5-carboxylic acid. | 1-(4'-methyl-phenyl)-3-methyl-5-pyrazolone. | 3:3'-dichloro-4:4'-diaminodiphenyl | yellow. |
| 2 | ----do---- | 1-(3'-methyl-phenyl)-3-methyl-5-pyrazolone. | ----do---- | Do. |
| 3 | 1-aminobenzene-4-carboxylic acid | 1-(2'-methyl-4'-chlorophenyl)-3-methyl-5-pyrazolone. | | |
| 4 | 1-amino-2-chlorobenzene-5-carboxylic acid. | 1-(4'-chloro-phenyl)-3-methyl-5-pyrazolone. | 3:3'-dichloro-4:4'-diaminodiphenylmethane. | Do. |
| 5 | ----do---- | ----do---- | 4:4'-dichloro-3:3'-diaminodiphenylsulfone. | Do. |
| 6 | ----do---- | ----do---- | 4:4'-diaminodiphenylether | Do. |
| 7 | ----do---- | ----do---- | 2:4:4'-trichloro-3:3'-diaminobenzophenone. | Do. |
| 8 | ----do---- | ----do---- | 1:5-diaminonaphthalene | Do. |

*Example 9*

41.9 parts of the monoazo dyestuff obtainable by coupling diazotized 4-aminobenzene-1-carboxylic acid with 4-chloro-2:5-dimethoxy-1-aceto-acetylaminobenzene in an acetic acid or weakly alkaline medium are suspended in 500 parts of dry toluene and at 100 to 110° C., 15 parts of thionyl chloride are added dropwise. The dyestuff gradually passes into solution with a yellow coloration, much hydrochloric acid evolving. Heating to 110° C. is continued until the evolution of hydrochloric acid ceases and the reaction mass then cooled to 10° C. The dyestuff acid chloride crystallizes in handsome yellow-orange crystals. They are separated by filtration, washed with some dry ether, and dried in vacuo. The chloride dissolves in hot benzene, toluene, chlorobenzene or glacial acetic acid. After recrystallization from toluene it melts at 248–250° C.

43.8 parts of the dyestuff acid chloride are dissolved in 600 parts of chlorobenzene at 120–130° C. and then 10.6 parts of 3:3'-dimethyl-4:4'-diaminodiphenyl quickly introduced. The condensation product instantly separates in the form of a yellow precipitate. The reaction mass is then heated to the boil until hydrochloric acid no longer evolves, which is the case after about 3 to 4 hours. It is then filtered while hot and the filter residue washed with some hot chlorobenzene, then with alcohol to remove the chlorobenezene. On drying there is obtained a yellow powder which is insoluble in organic solvents. In concentrated sulfuric acid it dissolves with a yellow coloration.

When incorporated by rolling into polyvinyl chloride the product gives a pure yellow color which is absolutely fast to migration and has a good fastness to light.

Dyestuffs with similar properties are obtained when in this example the 4-aminobenzene-1-carboxylic acid is replaced by 3-amino-benzene-1-carboxylic acid, 3-amino-4-chlorobenzene-1-carboxylic acid, 2-chloro-5-aminobenzene-1-carboxylic acid, 3-amino-4-methoxybenzene-1-carboxylic acid, 2 - amino - 4' - chloro-1:1'-diphenylether-4-carboxylic acid, or 2-amino-1:1'-diphenylsulfone-4-carboxylic acid. It is not necessary to isolate the dyestuff acid chloride. The condensation may alternatively be carried out by neutralizing by an addition of pyridine the hydrochloric acid and excess thionyl chloride present in the toluene solution of the chloride after the splitting off of hydrochloric acid, and then introducing the base. The end product thus obtained has the same properties as the one obtained by condensation with the isolated chloride.

Example 10

45.4 parts of the dyestuff obtained in the usual manner from diazotized 4-chloro-3-amino-benzene-1-carboxylic acid and 1-acetoacetylamino-2:5-dimethoxy-4-chlorobenzene are introduced into 440 parts of chlorobenzene while stirring. 17 parts of thionyl chloride are added to the mixture which is then heated to the boil. After about one hour the acid chloride of the dyestuff passes into solution. Boiling is continued for about another hour and the reaction mass then allowed to cool. The precipitated crystalline product is suction-filtered, washed with a small amount of cold chlorobenzene, and dried at 70–80° C. under reduced pressure.

23.6 parts of the acid chloride prepared according to the preceding paragraph are introduced into 550 parts of dry chlorobenzene and 5 parts of pyridine. 6.3 parts of 3:3'-dichloro-4:4'-diaminodiphenyl are added and the mixture is heated to the boil while stirring for about 24 hours. When condensation is complete the resulting pigment is suction-filtered while still hot, washed with warm chlorobenzene, then with hot alcohol, and dried. The condensation product of the formula

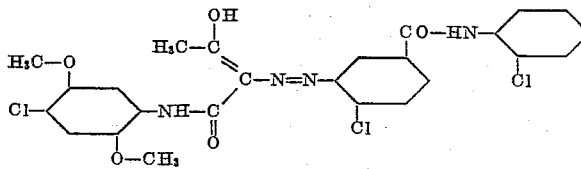

is a yellow pigment which is sparingly soluble or insoluble in the usual solvents and when incorporated by rolling, for instance in polyvinyl chloride produces a powerful reddish yellow coloration of good fastness to migration and light.

When instead of 3:3'-dichloro-4:4'-diamino-diphenyl the di-(4-aminobenzene-sulfone)-imine of the formula

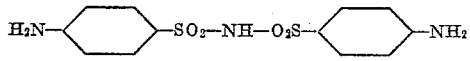

or the 4:4'-diaminodiphenylurea is used, yellow pigments are likewise obtained.

Example 11

43.8 parts of the dyestuff obtained in the usual manner from diazotized 4-chloro-3-aminobenzene-1-carboxylic acid and 1 - acetoacetylamino - 2 - methoxy - 4 - chloro-5-methyl-benzene are introduced while stirring into 660 parts of chlorobenzene. 17 parts of thionyl chloride are added and the mixture heated to the boil. After about one hour the acid chloride of the dyestuff passes into solution. Boiling is continued for about another hour and the reaction mass then allowed to cool. The precipitated crystalline product is suction-filtered, washed with a small amount of cold chlorobenzene and dried at 70–80° C. under reduced pressure. (Melting point of the acid chloride, 245° C.)

22.8 parts of the acid chloride obtained according to the preceding paragraph are introduced into 550 parts of dry chlorobenzene and 5 parts of pyridine. 6.3 parts of 3:3'-dichloro-4:4'-diaminodiphenyl are added and the mixture heated to the boil while stirring for about 24 hours. When condensation is complete, the resulting pigment is suction-filtered while still hot, washed with warm chlorobenzene, then with hot alcohol, and dried. The condensation dyestuff obtained is a yellow pigment which is sparingly soluble to insoluble in the usual solvents and when incorporated by rolling, e. g. into polyvinyl chloride produces a powerful greenish yellow shade of good fastness to migration and light.

When in this example the 3:3'-dichloro-4:4'-diaminodiphenyl is replaced by 3:3'-dimethyl-4:4'-diaminodiphenyl, valuable pigments of a somewhat redder shade are obtained.

Example 12

40.4 parts of the dyestuff obtained in the usual manner from diazotized 4-amino-3-nitro-1-benzene-1-carboxylic acid and 1-acetoacetylamino-2-chlorobenzene are introduced while stirring into 480 parts of nitrobenzene. 17 parts of thionyl chloride are added and the mixture heated to 130–150° C. After about one hour the acid chloride of the dyestuff passes into solution. Heating to 130–150° C. is continued for about an hour longer and the reaction mass then allowed to cool. The precipitated crystalline produce is suction-filtered, washed with a small amount of cold benzene, and dried at 70–80° C. under reduced pressure. (Melting point of the acid chloride, 261°–262° C., with decomposition.)

22.2 parts of the acid chloride obtained according to the foregoing paragraph are introduced into 770 parts of dry chlorobenzene and 5 parts of pyridine. 5.3 parts of 3:3'-dimethyl-4:4'-diaminodiphenyl are added and the mixture heated to the boil while stirring for about 24 hours. When condensation is complete the resultant pigment is separated by suction filtering while still hot, washed with warm chlorobenzene, then with hot alcohol,

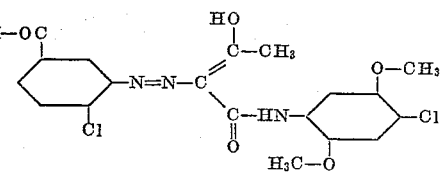

and dried. The condensation dyestuff is a greenish yellow pigment which is sparingly soluble to insoluble in the usual solvents and when incorporated by rolling, e. g. into polyvinyl chloride produces a powerful greenish yellow color of good fastness to migration and light. By mixing it with e. g. copper phthalocyanine valuable green shades are obtained.

Example 13

47.25 parts of the monoazo dyestuff obtained by coupling diazotized 3-nitro-4-aminobenzene-1-carboxylic acid with 1-acetoacetylamino-2-chloro-5-trifluoromethylbenzene in an acid or weakly alkaline medium are stirred with 500 parts of dry toluene and 10 parts by volume of thionyl chloride run in at about 100° C. The dyestuff soon passes into solution while a considerable evolution of hydrochloric acid takes place. Gentle boiling is continued for 2–3 hours longer, that is to say, until hydrochloric acid is no longer evolved and the reaction mass then cooled to 10° C. The dyestuff acid chloride then crystallizes in the form of fine pale yellow crystals. These are filtered, washed with a small amount of cold toluene and dried at 50–60° C. under reduced pressure.

The dyestuff acid chloride thus obtained is a pale yellow powder which after recrystallization from benzene has a melting point of 211–213° C.

49.1 parts of the dyestuff acid chloride thus obtained are dissolved in 800 parts of chlorobenzene at 120–130° C. A solution of 10.6 parts of 3:3'-dimethyl-4:4'- diaminodiphenyl in 100 parts of chlorobenzene is then rapidly poured in. The condensation product instantly separates as a thick yellow precipitate. The reaction mass is then gently boiled until the evolution of hydrochloric acid ceases which is the case after about 3-4 hours. A slow current of ammonia gas in introduced until a test portion stirred with water shows a neutral reaction. The reaction mass is then filtered while hot, washed with chlorobenzene having a temperature of 100° C. until the washings are colorless, and dried in vacuo at 80-90° C.

The dyestuff is obtained in this manner in the form of a fine yellow powder which dissolves in concentrated sulfuric acid with a yellow coloration and is practically insoluble in the usual organic solvents.

Similar pigments can be obtained by using as diazo component other aminocarboxylic acids, such as e. g. 3-aminobenzene-1-carboxylic acid, 4-aminobenzene-1-carboxylic acid, 4-chloro-3-aminobenzene-1-carboxylic acid, 3-amino-4-methoxybenzene-1-carboxylic acid or 3- or 4-aminophenylacetic acid.

In the table given below are set out further valuable dyestuffs which are obtained by condensing in the manner described above two molecular proportions of the dyestuff, converted into its acid chloride, from the diazo component given in column I and the azo component given in column II with one molecular proportion of the diamine given in column III.

containing a hydroxyl group in a position vicinal to the azo group, and —HN—$R_5$—NH— represents the radical of a non-vattable aromatic carbocyclic diamine, each of the —HN— groups being bound to an aromatic carbon atom of $R_5$.

3. An acid amide derivative of an azo dyestuff, which derivative is free from sulfonic acid groups and corresponds to the formula $R_3$—N=N—$R_1$—CO—HN—$R_5$—
                         NH—OC—$R_1$—N=N—$R_3$ in which $R_1$ represents an aromatic radical of the benzene series, $R_3$ represents the radical of a hydroxynaphthalene bound to the azo group in ortho-position to the hydroxyl groups, and —HN—$R_5$—NH— represents the radical of a non-vattable aromatic carbocyclic diamine, each of the —HN— groups being bound to an aromatic carbon atom of $R_5$.

4. An acid amide derivative of an azo dyestuff, which derivative is free from sulfonic acid groups and corresponds to the formula

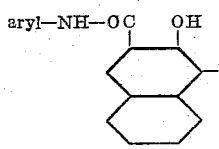—N=N—$R_1$—CO—HN—$R_5$—NH—OC—$R_1$—N=N—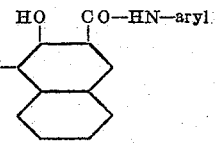

in which $R_1$ represents an aromatic radical of the benzene series, and —HN—$R_5$—NH— represents the radical of a non-vattable aromatic carbocyclic diamine, each of the —HN— groups being bound to an aromatic carbon atom of $R_5$.

5. An acid amide derivative of an azo dyestuff, which

| | I. Diazo component | II. Azo component | III. Diamine | IV. Color |
|---|---|---|---|---|
| 1 | 1-amino-2-chlorobenzene-5-carboxylic acid. | 1-acetoacetylamino-2-chlorobenzene. | di-(p-aminobenzoyl)1: 6-diaminohexane. | yellow. |
| 2 | ----do---- | 1-acetoacetylamino-2-methoxy-4-chloro-5-methylbenzene. | ----do---- | Do. |
| 3 | 1-aminobenzene-2-carboxylic acid. | 1-acetoacetylamino-2-chlorobenzene. | 4:4'-diaminodiphenyl. | Do. |
| 4 | 2-amino-1:1'-diphenylether-4-carboxylic acid. | 1-acetoacetylamino-4-methoxy benzene. | 3:3'-dimethyl-4:4-diaminodiphenyl. | Do. |
| 5 | ----do---- | 1-lacetoacetylamino-4-ethoxybenzene. | ----do---- | Do. |
| 6 | 1-amino-2-nitrobenzene-4-carboxylic acid. | 2-acetoacetylamino-6-ethoybenzthiazole. | 4:4'-diaminodiphenyl. | yellowish brown. |
| 7 | ----do---- | 1-benzoylacetylamino-2-methoxy-4-chloro-5-methyl benzene. | 3:3'-dimethyl-4:4'-diaminodephenyl. | greenish yellow. |
| 8 | ----do---- | ----do---- | 3:3'-dichlor-4:4'-diaminodiphenyl. | reddish yellow. |
| 9 | ----do---- | 1-benzoylacetylamino-2-chlorobenzene. | ----do---- | greenish yellow. |
| 10 | ----do---- | ----do---- | 1:4-diaminobenzene. | Do. |
| 11 | ----do---- | di-(p-chlorbenzoyl)-methane. | ----do---- | yellow. |
| 12 | ----do---- | ----do---- | 3:3'-dichloro-4:4'-diaminodiphenyl. | Do. |
| 13 | 2-amino-1:1'-diphenylether-4-carboxylic acid. | ----do---- | ----do---- | Do. |
| 14 | ----do---- | ----do---- | 3:3'-dimethyl-4:4'-diaminodiphenyl. | Do. |

What is claimed is:

1. An acid amide derivative of an azo dyestuff, which derivative is free from sulfonic acid groups and corresponds to the formula $R_3$—N=N—$R_1$—CO—HN—$R_5$—NH—OC—R in which $R_1$—CO— represents the radical of a diazo component, $R_3$ represents the radical of a coupling component containing a hydroxyl group in a position vicinal to the azo group, —OC—R represents a radical containing an azo group, and $R_5$ represents the radical of a non-vattable aromatic carbocyclic compound.

2. An acid amide derivative of an azo dyestuff, which derivative is free from sulfonic acid groups and corresponds to the formula $R_3$—N=N—$R_1$—CO—HN—$R_5$—
                         NH—OC—$R_1$—N=N—$R_3$ in which $R_1$ represents an aromatic radical of the benzene series, $R_3$ represents the radical of a coupling component derivative is free from sulfonic acid groups and corresponds to the formula

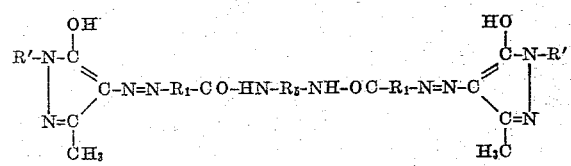

in which $R_1$ and $R'$ each represents an aromatic radical of the benzene series, and —HN—$R_5$—NH— represents the radical of a non-vattable aromatic carbocyclic diamine, each of the —HN— groups being bound to an aromatic carbon atom of $R_5$.

6. An acid amide derivative of an azo dyestuff, which derivative is free from sulfonic acid groups and corresponds to the formula

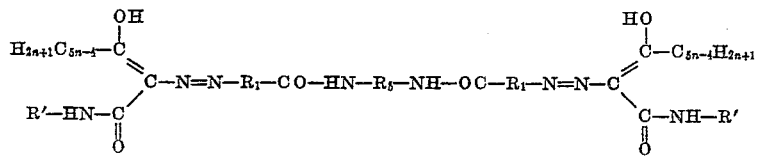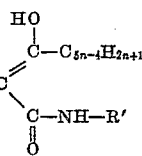

in which $n$ represents a whole number of at the most 2, $R_1$ and $R'$ each represents an aromatic radical of the benzene series and $-HN-R_5-NH$ represents the radical of a non-vattable aromatic carbocyclic diamine, each of the $-HN-$ groups being bound to an aromatic carbon atom of $R_5$.

7. The acid amide derivative of the formula

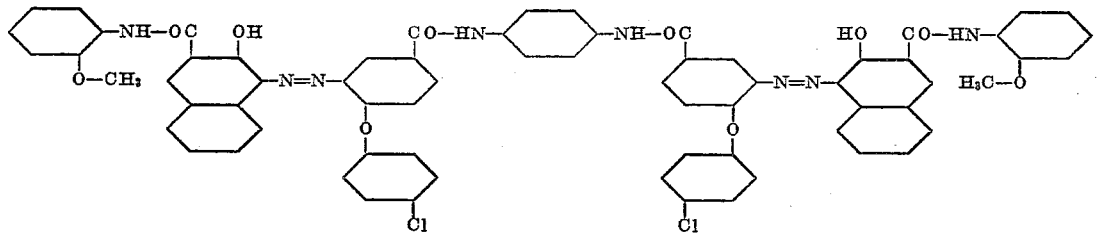

8. The acid amide derivative of the formula

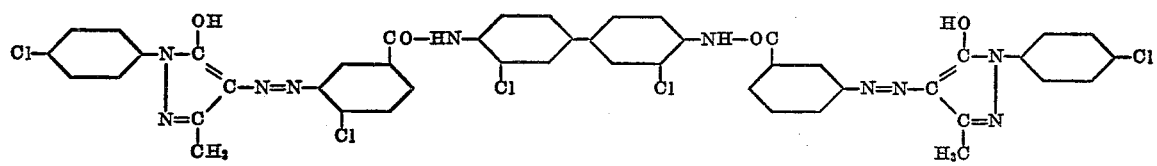

9. The acid amide derivative of the formula

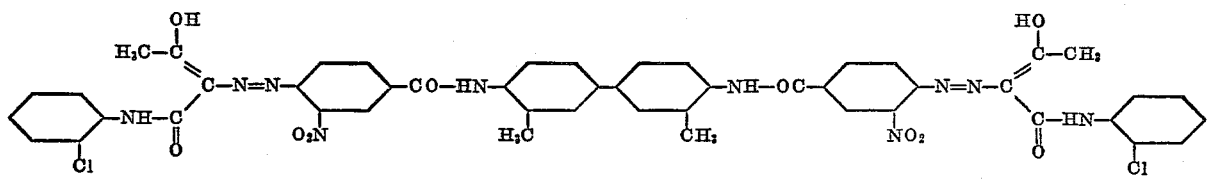

10. The acid amide derivative of the formula

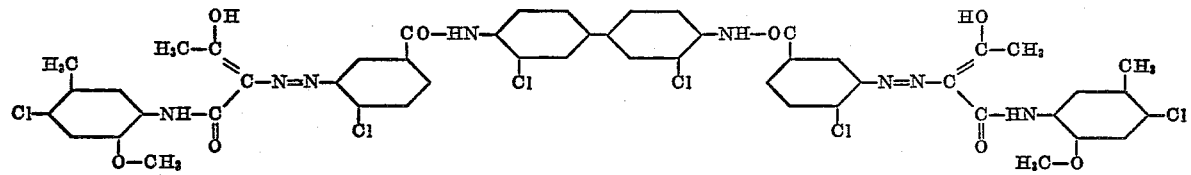

11. The acid amide derivative of the formula

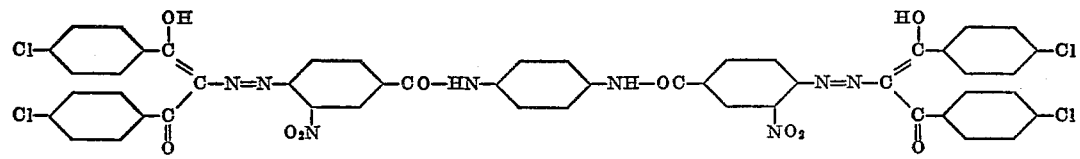

References Cited in the file of this patent
UNITED STATES PATENTS

| | | |
|---|---|---|
| 1,896,450 | Lange | Feb. 7, 1933 |
| 2,148,135 | Rossander | Feb. 21, 1939 |

FOREIGN PATENTS

| | | |
|---|---|---|
| 78,380 | Norway | Apr. 9, 1951 |